(No Model.)
J. KRAUSS.
VEHICLE.
No. 502,303. Patented Aug. 1, 1893.
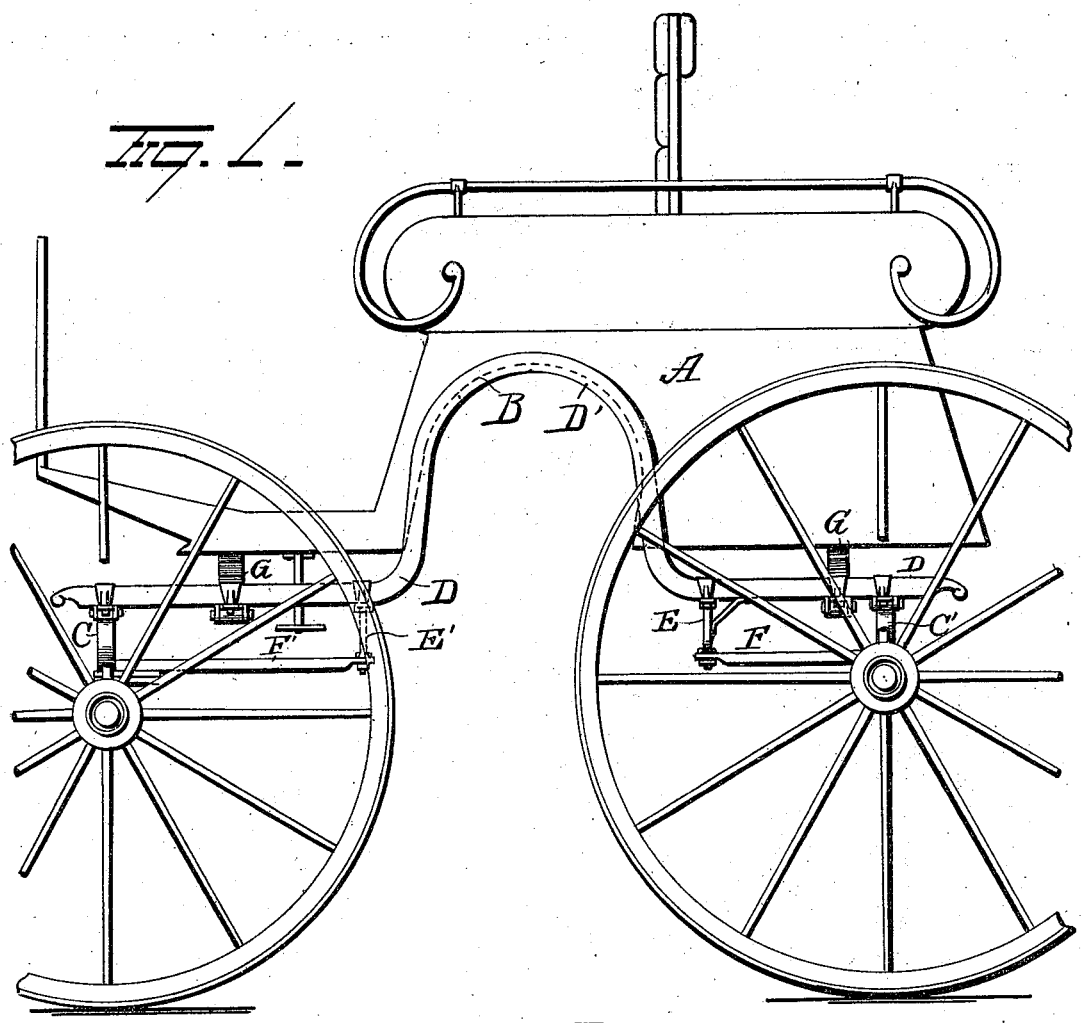
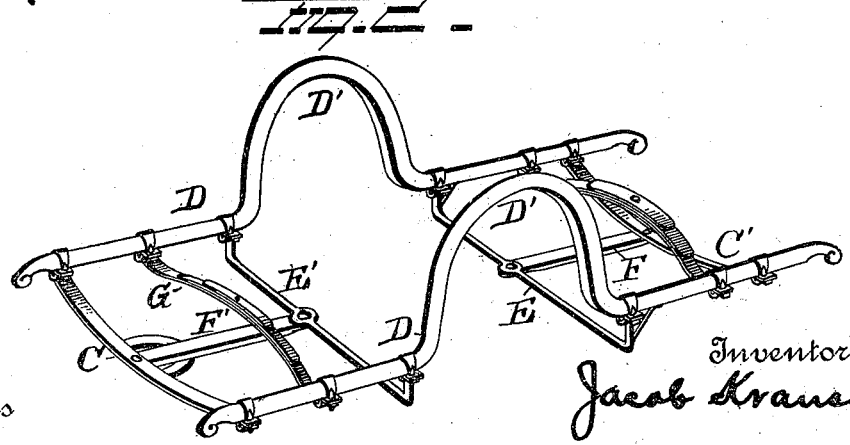
Witnesses
G. F. Downing.
V. E. Hodges
Inventor
Jacob Krauss
By H. A. Seymour
Attorney

UNITED STATES PATENT OFFICE.

JACOB KRAUSS, OF LEXINGTON, KENTUCKY.

VEHICLE.

SPECIFICATION forming part of Letters Patent No. 502,303, dated August 1, 1893.

Application filed February 9, 1893. Serial No. 461,612. (No model.)

*To all whom it may concern:*

Be it known that I, JACOB KRAUSS, a resident of Lexington, in the county of Fayette and State of Kentucky, have invented certain new and useful Improvements in Vehicles; and I do hereby declare the following to be a full, clear, and exact description of the invention, such as will enable others skilled in the art to which it appertains to make and use the same.

My invention relates to an improvement in vehicles.

The principal reason for using the side bar in constructing a vehicle is for the purpose of hanging the body low, and shortening the gearing,—but while these two points are gained, it necessitates the vehicle to require considerably more space in which to turn.

It is the object of my invention to obviate this defect and to construct a side bar vehicle in such manner that it can be turned in a small space, and so that the gearing can be coupled shorter than has heretofore been the practice.

With these objects in view the invention consists in certain novel features of construction and combinations and arrangements of parts as hereinafter set forth and pointed out in the claims.

In the accompanying drawings: Figure 1 is a side elevation of a vehicle with my improvements applied thereto. Fig. 2 is a perspective view of the running gear.

A represents the vehicle, and B the curved portion or wheel house. The front cross bar C and the rear axle C', are connected to the respective ends of two side bars D, D. Each side bar D is curved upwardly at points D' between the ends thereof to conform with the shape of the curved portion of wheel house B, thereby permitting the front wheels of the vehicle to pass under the body when the vehicle is being turned, and enabling the same to be turned in a very small space.

In order that there may be no obstruction to the front wheel in turning the vehicle and that said wheels may pass fully under the body in the curved portion thereof, the reach usually employed with vehicles of this class is dispensed with. In lieu of the reach usually employed, the devices now to be described will be employed.

At opposite sides of the curved portions D' of the side bars D, cross bars E E' are located, said cross bars being secured, at their respective ends to said side bars, as clearly shown in Fig. 2. A coupling rod F, is secured at one end to the cross bar E, preferably at the center thereof, and at the other end to the rear axle C'. A similar coupling rod F', is secured at one end to the cross bar E', preferably at its center, and at the other end to the front cross bar C of the vehicle. The body of the vehicle rests on semi-elliptical springs G and is preferably secured thereto. The ends of the springs G are connected with the respective side bars D, D, by means of suitable clips.

By constructing a side bar vehicle as above explained, the body can be hung lower down than with straight side bars, and the gearing can be coupled from twelve to twenty-four inches shorter. By my improvements the vehicle can be turned in a space no wider than the length thereof.

Having fully described my invention, what I claim as new, and desire to secure by Letters Patent, is—

1. In a vehicle, the combination with a body portion, rear axle, and front cross bar or bolster, side bars curved upwardly at a point between the ends, cross bars secured at their ends to the side bars at opposite sides of the center thereof, and coupling rods connecting said cross bars respectively with the rear axle and front cross bar or bolster, substantially as set forth.

2. In a vehicle, the combination with a body portion having a curved portion or wheel house, the rear axle, and the front cross bar or bolster, of side bars, each having a curved portion extending upwardly in conformity with the curved portion or wheel house of the body portion, cross bars secured to and connecting the side at opposite sides of the curved portions thereof, and coupling rods connecting said cross bars respectively with the rear axle and the front cross bar or bolster, substantially as set forth.

In testimony whereof I have signed this specification in the presence of two subscribing witnesses.

JACOB KRAUSS.

Witnesses:
THOMAS ROOD,
C. SUYDAM SCOTT.